United States Patent
Prokhorov

(10) Patent No.: US 8,145,383 B2
(45) Date of Patent: Mar. 27, 2012

(54) PROCESS AND SYSTEM FOR CONTROLLING AIR QUALITY WITHIN AN INTERIOR OF A MOTOR VEHICLE

(75) Inventor: Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 431 days.

(21) Appl. No.: 12/543,016

(22) Filed: Aug. 18, 2009

(65) Prior Publication Data

US 2011/0046846 A1    Feb. 24, 2011

(51) Int. Cl.
*G06F 7/00* (2006.01)

(52) U.S. Cl. ............. 701/36; 701/49; 454/75; 454/139; 62/244

(58) Field of Classification Search ............ 701/10, 701/36, 49, 65, 1; 374/16, 20; 62/244, 239; 454/75, 139, 158
See application file for complete search history.

(56) References Cited

U.S. PATENT DOCUMENTS

| 6,078,853 | A | 6/2000 | Ebner et al. |
| 6,587,758 | B2* | 7/2003 | Obradovich et al. ............ 701/1 |
| 6,758,739 | B1 | 7/2004 | Sangwan et al. |
| 6,823,727 | B2 | 11/2004 | Friedel et al. |
| 7,080,523 | B2* | 7/2006 | Maeda et al. ................... 62/244 |

* cited by examiner

*Primary Examiner* — Richard M. Camby
(74) *Attorney, Agent, or Firm* — Gifford, Krass, Sprinkle, Anderson & Citkowski, P.C.

(57) ABSTRACT

The present invention discloses a process for controlling air quality within an interior of a motor vehicle. The process can include providing a motor vehicle with a heating-venting-air conditioning (HVAC) system, the HVAC system having an internal air supply option and an external air supply option. The process can also include providing a reinforcement learning system that can increase the air quality within the motor vehicle as a function of user preferences with respect to choosing the external air supply or the internal air supply.

21 Claims, 2 Drawing Sheets

PROCESS AND SYSTEM FOR CONTROLLING AIR QUALITY WITHIN AN INTERIOR OF A MOTOR VEHICLE

FIELD OF THE INVENTION

The present invention relates to a process and a system for controlling air quality. In particular, the process and system relate to controlling the air quality within an interior of a motor vehicle.

BACKGROUND OF THE INVENTION

Most motor vehicles have a heating-venting-air conditioning (HVAC) system that can be used to control the temperature of air that is supplied to an interior of the motor vehicle. Such systems typically have one or more controls that afford for the HVAC system to cool or heat air entering into the interior. In addition, most HVAC systems allow for air to be recirculated within the interior of the motor vehicle, or in the alternative, allow air to enter the interior from the exterior of the motor vehicle.

It is known that recirculating air from within the interior of the motor vehicle can reduce or prevent odors, smoke, and the like from entering the interior when such air is originally located exterior to the motor vehicle. In addition, the recirculation of the air within the interior can be filtered in order to remove dust particles, smoke particles, odor, and the like. In this manner, air quality within the interior of the vehicle can be improved by selecting a recirculation air supply option of the HVAC system. In the alternative, the use of air from the exterior of the vehicle can be used to provide fresh air, reduce the humidity within the interior of the motor vehicle, and the like.

The use of air quality sensors, also known as electronic noses, as part of a system to improve the quality of air within a motor vehicle is also known. Such air quality sensors can include carbon monoxide sensors, carbon dioxide sensors, ozone sensors, nitrous oxide sensors, hydrocarbon sensors, and the like. Such sensors can be in electronic communication with a controller that affords external air to enter the interior of the motor vehicle and/or recirculation of air from within the interior of the motor vehicle. However, such sensors are expensive and do not take into account the preferences of an individual driving and/or located within the interior of the vehicle. As such, a method and/or a system for improving the air quality within the interior of the motor vehicle that does not need and/or use air quality sensors such as electronic noses, but does incorporate the preferences of an individual within the interior of the motor vehicle, would be desirable.

SUMMARY OF THE INVENTION

The present invention discloses a process for controlling air quality within an interior of a motor vehicle. The process can include providing a motor vehicle with a heating-venting-air conditioning (HVAC) system, the HVAC system having an internal air supply (IAS) option and an external air supply (EAS) option. The HVAC system can optionally have an automated controller that is operative to activate the IAS for an IAS time and to activate the EAS for an EAS time. The HVAC system can also have a manual controller that is operative for an individual to manually activate the IAS and the EAS.

The process also includes providing a reinforcement learning system (RLS) that has a memory circuitry and a processing circuitry. The memory circuitry can have a lookup table with a plurality of cells, and each of the cells can be associated with a motor vehicle condition. Each of the cells can also have a datum for a number of manual IAS activations, a datum for a number of manual EAS activations, the IAS time the IAS is to be activated and the EAS time the EAS is to be activated. The processing circuitry can query one or more of the plurality of cells as a function of a current motor vehicle condition, read the number of manual IAS activations and the number of manual EAS activations from the cell, read the IAS time and the EAS time, and adjust the IAS time and the EAS time as a function of the queried data.

The adjusting of the IAS time and the EAS time can include increasing the first amount and decreasing the EAS time if the number of manual IAS activations is greater than the number of manual EAS activations. In the alternative, the processing circuitry can decrease the IAS time and increase the EAS time if the number of manual IAS activations is less than the number of manual EAS activations. In still another embodiment, the processing circuitry can leave the IAS time and the EAS time unchanged if the number of manual IAS activations is equal to the number of manual EAS activations.

The motor vehicle condition can include a temperature that is external to the motor vehicle, a temperature of an interior of the motor vehicle, a barometric pressure outside and/or inside the motor vehicle, a humidity outside the motor vehicle, a humidity inside the motor vehicle, a traveling speed of the motor vehicle, a GPS location of the motor vehicle, proximity of the motor vehicle to other objects, combinations thereof and the like. In addition, one or more of the plurality of cells can be associated with a combination of different motor vehicle conditions and/or at least one of the motor vehicle conditions can be coded in a linguistic variable, i.e. fuzzy logic.

The IAS time and the EAS time can be increased and/or decreased according to the expression $$t_j^{i+1} = f(t_j^i, \Delta t_j) j=1,2$$

where $t_1^{i+1}$ is an adjusted IAS time, $t_1^i$ is a previous adjusted IAS time, $\Delta t_1$ is a change in the IAS time, $t_2^{i+1}$ is an adjusted EAS time, $t_2^i$ is a previous adjusted EAS time, and $\Delta t_2$ is a change in the EAS time. In some instances, $$f(t_j^i, \Delta t_j) = t_j^i + \Delta t_j$$

for increasing the IAS time when j=1 and increasing the EAS time when j=2, and $$f(t_j^i, \Delta t_j) = t_j^i - \Delta t_j$$

for decreasing the IAS time when j=1 and decreasing the EAS time when j=2. In other instances, $$f(t_j^i, \Delta t_j) = t_j^i \cdot \Delta t_j$$

for increasing the IAS time when j=1 and increasing the EAS time when j=2, and $$f(t_j^i, \Delta t_j) = t_j^i / \Delta t_j$$

for decreasing the IAS time when j=1 and decreasing the EAS time when j=2.

An air quality control system for controlling the air quality within the interior of the motor vehicle can also be included. The air quality control system includes providing a motor vehicle with an HVAC system, the HVAC system having the IAS option and the EAS option. A manual controller that is operative for an individual to manually activate the IAS and the EAS is also provided, along with the RLS that has the memory circuitry and the processing circuitry.

DETAILED DESCRIPTION OF THE PRESENT INVENTION

Figure 1:
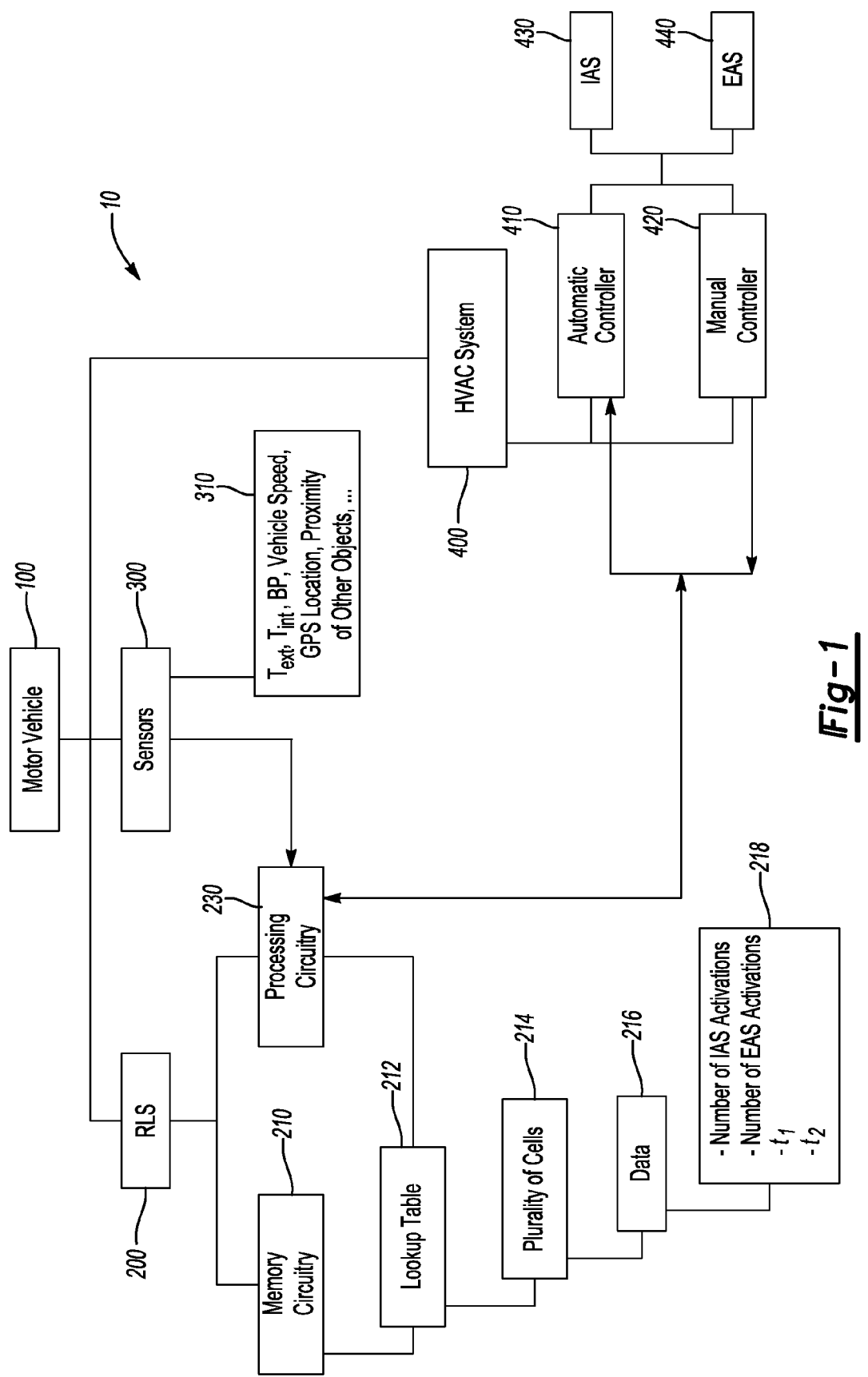
FIG. 1 is a schematic diagram illustrating an embodiment of the present invention.

The present invention discloses a process and/or a system for controlling air quality within an interior of a motor vehicle. As such, the process and/or system have utility as a component of a motor vehicle.

The process can include providing a reinforcement learning system (RLS), the RLS operative to adjust the amount or flow of internal air and/or external air to an interior of the motor vehicle according to the behavior, desire, preference, etc. of an individual. In addition, the RLS affords for controlling the air quality within the interior of the motor vehicle without the use of additional air quality sensors, e.g. electronic noses, such as sensors that detect carbon monoxide, carbon dioxide, ozone, nitrous oxide, hydrocarbons, and the like.

The RLS can include a memory circuitry and a processing circuitry. The memory circuitry can have a lookup table with a plurality of cells, each of the cells being associated with a motor vehicle condition. In addition, one or more of the cells can have a datum for a number of manual internal air supply (IAS) activations, a datum for a number of manual external air supply (EAS) activations, an IAS time the IAS is to be activated and an EAS time the EAS is to be activated. In this manner, a given cell of the lookup table can have a record for the number of times the IAS and the EAS have been activated by an individual within the motor vehicle for a given motor vehicle condition and/or for a combination of motor vehicle conditions.

The processing circuitry can query one or more of the cells as a function of a current motor vehicle condition, read the number of manual IAS activations and the number of manual EAS activations for the cell, and then adjust an amount of time for the IAS to be activated and the EAS to be activated. As such, the preferences of the individual within the interior of the motor vehicle can be taken into account and used to control the air quality within the interior.

Adjustment of the amount of time for the IAS to be activated and for the EAS to be activated can include increasing the IAS time for IAS activation and decreasing the EAS time for EAS activation if the number of manual IAS activations is greater than the number of manual EAS activations. Likewise, the amount of time for IAS and EAS can be adjusted by decreasing the first amount time and increasing the EAS time if the number of manual IAS activations is less than the number of manual EAS activations. It is appreciated that the IAS time and the EAS time can be left unchanged if the number of manual IAS activations is equal to the number of manual EAS activations.

The motor vehicle condition and/or a combination of motor vehicle conditions can be selected from any motor vehicle condition known to those skilled in the art, illustratively including a temperature that is external to the motor vehicle, a temperature of the interior of the motor vehicle, a barometric pressure outside and/or inside the motor vehicle, a humidity outside the motor vehicle, a humidity inside the motor vehicle, a traveling speed of the motor vehicle, a GPS location of the motor vehicle, proximity of the motor vehicle with respect to other objects, combinations thereof and the like. As such, one or more of the cells of the lookup table in the memory circuitry can be associated with a value or a range of values for one or more motor vehicle conditions. In addition, at least one of the motor vehicle conditions can be coded in a linguistic variable, i.e. fuzzy logic.

The times for IAS activation and EAS activation increased or decreased according to the expression:

$$t_j^{i+1} = f(t_j^i, \Delta t_j) j=1,2$$

where $t_1^{i+1}$ is an adjusted IAS time, $t_1^i$ is a previous adjusted IAS time, $\Delta t_1$ is a change in the IAS time, $t_2^{i+1}$ is an adjusted EAS time, $t_2^i$ is a previous adjusted EAS time, and $\Delta t_2$ is a change in the EAS time. In some instances, $$f(t_j^i, \Delta t_j) = t_j^i + \Delta t_j$$

for increasing the IAS time when j=1 and increasing the EAS time when j=2. In the alternative, $$f(t_j^i, \Delta t_j) = t_j^i - \Delta t_j$$

for decreasing the IAS time when j=1 and decreasing the EAS time when j=2. In other instances, $$f(t_j^i, \Delta t_j) = t_j^i \cdot \Delta t_j$$

for increasing the IAS time when j=1 and increasing the EAS time when j=2, and $$f(t_j^i, \Delta t_j) = t_j^i / \Delta t_j$$

for decreasing the IAS time when j=1 and decreasing the EAS time when j=2. It is appreciated that other expressions can be used for adjusting the IAS time and the EAS time.

An air quality control system for controlling the air quality within the interior of the motor vehicle is also disclosed. The system includes a motor vehicle with an HVAC system, the HVAC system having an IAS option and an EAS option. The HVAC can also have a manual controller that is operative for an individual to manually activate the IAS and the EAS. In addition, an optional automated controller can be included that automatically switches the HVAC system from the IAS to the EAS, and vice versa, based on instructions from the RLS.

The RLS can have a memory circuitry and a processing circuitry, and is in electronic communication with the IAS option and the EAS option. The memory circuitry can include a lookup table with a plurality of cells, each of the plurality of cells being associated with a motor vehicle condition and having stored data related to the number of manual IAS activations and the number of manual EAS activations. Each of the plurality of cells can also have a stored IAS time value associated with how long the IAS option should be activated for a particular motor vehicle condition and a stored EAS time value associated with how long the EAS option should be activated for the same motor vehicle condition.

The processing circuitry is operative to query one or more of the plurality of cells as a function of a current motor vehicle condition and/or a combination of motor vehicle conditions. The processing circuitry can read the number of manual IAS activations and the number of manual EAS activations stored within a particular cell and adjust the IAS time and the EAS time as a function of the manual IAS and EAS activations.

Turning now to FIG. 1, a schematic diagram of a system 10 for controlling the air quality within an interior of a motor vehicle is shown. The system 10 includes a motor vehicle 100 with an RLS 200, one or more sensors 300, and an HVAC system 400. The RLS 200 can include a memory circuitry 210 and a processing circuitry 230. The memory circuitry 210 can have a lookup table 212, the lookup table 212 having a plurality of cells 214 with data 216. Each of the cells 214 can be associated with one or more motor vehicle conditions as described above. The data 216 can be in the form of a number of manual IAS activations, a number of EAS activations, an IAS time $t_1$, an EAS time $t_2$, and the like. It is appreciated that the IAS/EAS time can be an updated or adjusted IAS/EAS time, e.g. $t_1^i$, $t_1^{i+1}$, $t_2^i$, $t_2^{i+1}$ etc. The processing circuitry 230 can be in electronic communication with the memory circuitry 210 and in particular with the lookup table 212.

One or more sensors 310 can include a temperature sensor for an exterior of the motor vehicle ($T_{ext}$), a temperature sensor for the interior of the motor vehicle ($T_{int}$), a barometric pressure sensor for the exterior and/or interior of the vehicle (BP), a vehicle speed sensor, a GPS sensor, a proximity sensor and the like. It is noted that the sensors do not include air quality sensors such as electronic noses that detect gaseous species such as carbon monoxide, carbon dioxide, ozone, nitrous oxide, hydrocarbons, and the like. In the alternative, one or more electronic nose sensors can be included and used in combination with the sensors 310.

The HVAC system 400 can include an optional automated controller 410 and a manual controller 420. The manual controller 420 is operable to select an internal air supply 430 and an external air supply 440. The internal air supply 430 can include recirculation of air that is present within the interior of the motor vehicle 100. In some instances, the air is filtered as it is recirculated. In this manner, air within the interior of the motor vehicle can have its quality improved by the removal of dust particles, smoke particles, odors, and the like therefrom.

The automated controller 410 can be in electronic communication with the processing circuitry 230. In addition, the manual controller 420 can be in electronic communication with the RLS 200, and in some instances the processing circuitry 230, such that when an individual selects the IAS 430 or the EAS 440, this action can be recorded within the memory circuitry 210.

Figure 2:
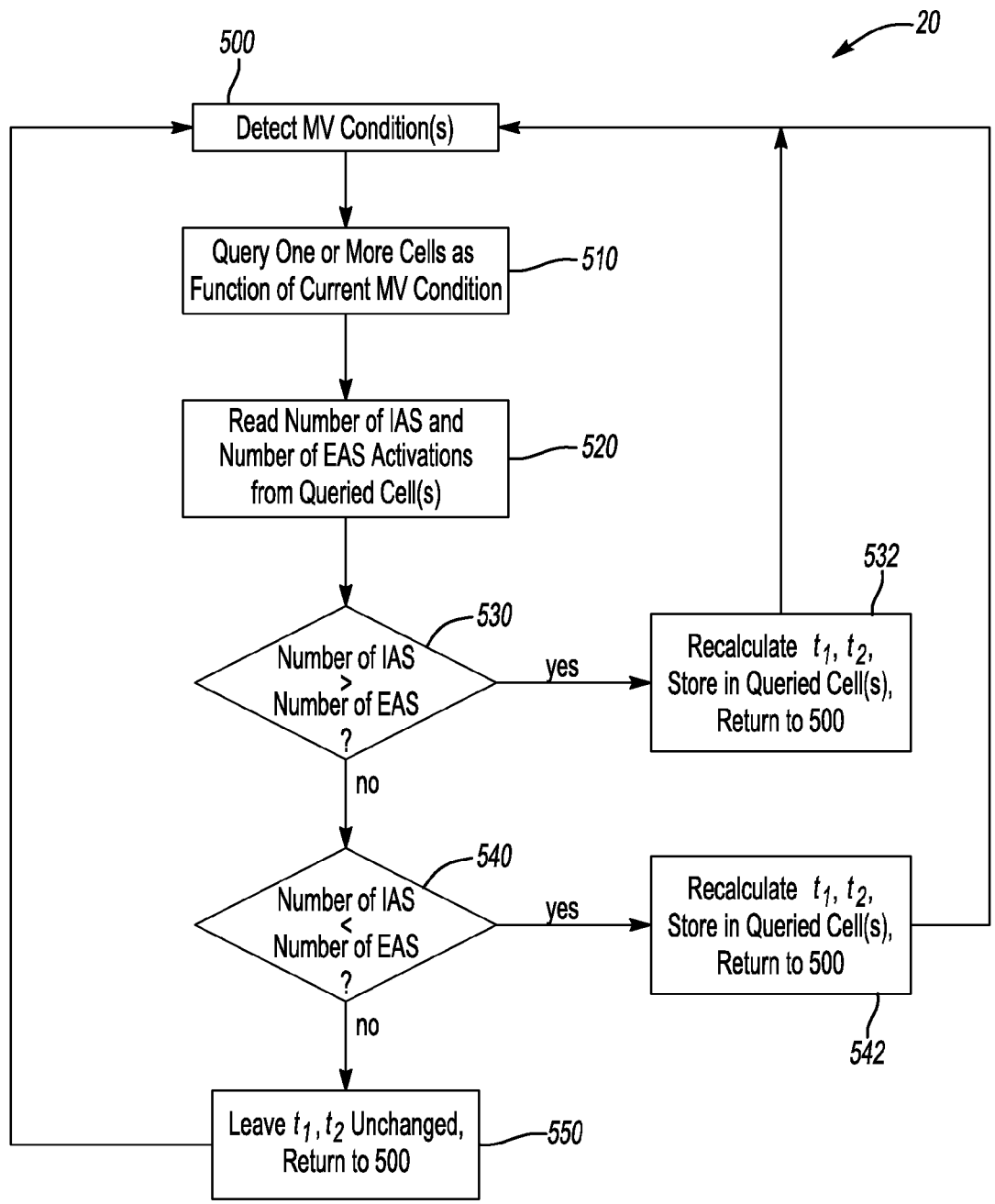
FIG. 2 is a schematic diagram illustrating another embodiment of the present invention.

Turning now to FIG. 2, a process for improving air quality within an interior of a motor vehicle is shown generally at reference numeral 20. The process 20 includes the detection of a motor vehicle (MV) condition or a combination of motor vehicle conditions at step 500. Thereafter, one or more cells of the lookup table 212 is queried by the processing circuitry 230 as a function of the current motor vehicle condition or the current combination of motor vehicle conditions at step 510. Upon query of one or more cells, the processing circuitry 230 reads the number of IAS activations and the number of EAS activations stored therewithin at step 520.

Upon reading the IAS and EAS activation data, the processing circuitry determines whether or not the number of IAS activations is greater than the number of EAS activations at step 530. If the number of IAS activations is greater than the number of EAS activations, then the processing circuitry 230 recalculates the IAS time $t_1^{i+1}$, recalculates the EAS time $t_2^{i+1}$ and stores the recalculated times in the queried one or more cells before returning to step 500. The adjusted times are then used by the processing circuitry 230 to control the length of time the IAS 430 is activated and the length of time the EAS 440 is activated for a given motor vehicle condition or combination of motor vehicle conditions.

In the alternative, if the number of manual IAS activations is not greater than the number of manual EAS activations, then the process proceeds to step 540 where the processing circuitry 230 determines whether or not the number of manual IAS activations is less than the number of manual EAS activations. If this test results in a positive answer, the processing circuitry 230 recalculates the IAS time $t_1^{i+1}$ and the EAS time $t_2^{i+1}$, stores the recalculated times in the appropriate queried cell, and then returns to the step 500. In the alternative, if the result of the test at step 540 is negative, the IAS time and the EAS time are left unchanged and the process returns to step 500. In this manner, the amount of time that the processing circuitry 230 affords for the IAS 430 to be activated and the EAS 440 to be activated is a function of the actions of the individual within the interior of the motor vehicle and his/her selection of the IAS or the EAS for a given motor vehicle condition.

In order to better illustrate an embodiment of the present invention, but in no way limit the scope thereof, an example of at least a portion of a system and/or process is provided below.

EXAMPLE

Table 1 provides an example pseudo computer code illustrative of a processing circuitry operation. In addition, Table 2 illustrates an example of a lookup table.

TABLE 1

```
// Initialize Table T2D (at factory):
for all i,j, do:
set  i=RANGE_INTERNAL_TEMPERATURE;
set  j=RANGE_EXTERNAL_TEMPERATURE;
set  T2D(i,j).S1=T2D(i,j).S2=0;
     T2D(i,j).T1,
     T2D(i,j).T2,
     T1min, T2min, T1max, T2max, delta_T1, delta_T2, delta_time.
end
//Operation:
counter_state=0;
RUN from IGNITION_KEY=ON till IGNITION_KEY_OFF:
    if TRIGGER=ON, do:
        if switched from external air to internal air,
        then T2D(i,j).S1++; T2D(i,j).T2=counter_state;
        if switched from internal air to external air,
        then T2D(i,j).S2++; T2D(i,j).T1=counter_state;
        if T2D(i,j).S1 > T2D(i,j).S2,
        then T2D(i,j).T1 += delta_T1; T2D(i,j).T2 -= delta_T2;
        if T2D(i,j).S1 < T2D(i,j).S2,
        then T2D(i,j).T1 -= delta_T1; T2D(i,j).T2 += delta_T2;
        if T2D(i,j).T1 < T1min, then T2D(i,j).T1 = T1min;
        if T2D(i,j).T2 < T2min, then T2D(i,j).T2 = T2min;
        if T2D(i,j).T1 > T1max, then T2D(i,j).T1 = T1max;
        if T2D(i,j).T2 > T2max, then T2D(i,j).T2 = T2max;
        counter_state=0;   // reset counter_state
    end  // of TRIGGER
counter_state += delta_time;
if running on internal air AND counter_state > T2D(i,j).T1,
then switch to external air, counter_state=0;   // reset counter_state
if running on external air AND counter_state > T2D(i,j).T2,
then switch to internal air, counter_state=0;   // reset counter_state
end  // of RUN
```

TABLE 2

| External air temperature range | Internal air temperature range | | | | | |
|---|---|---|---|---|---|---|
| | −20° C. and below | −20° C. to −10° C. | −10° C. to 0° C. | 0° C. to +10° C. | +10° C. to +20° C. | +20° C. and above |
| −20° C. and below | 2/2 | no data | no data | no data | no data | no data |
| −20° C. to −10° C. | 3/4 | 3/8 | no data | no data | no data | no data |
| −10° C. to 0° C. | 5/6 | 12/10 | 10/15 | no data | no data | no data |
| 0° C. to +10° C. | 4/7 | 10/9 | 23/18 | 22/20 | no data | no data |
| +10° C. to +20° C. | no data | 5/7 | 13/16 | 18/15 | 30/21 | 10/2 |
| +20° C. and above | no data | no data | 12/15 | 28/25 | 27/24 | 40/25 |

In some instances, the cells shown in Table 2 can be preset with durations of time for the IAS and the EAS to be activated. For example, the IAS time for the activation of the IAS can be much greater than the EAS time for which the EAS is to be activated. In one instance, the IAS time can be equal to 600 seconds and the EAS time can be equal to 60 seconds. It is appreciated that the cells of the lookup table can have long durations of running on both internal and external air if one or more of the motor vehicle conditions are within a certain range or ranges, or in the alternative, very short duration in other ranges. For example, short durations of operating with EAS can be specified if the motor vehicle is determined to be close to other objects on the road such as other vehicles whose exhaust could negatively affect the air quality within the interior of the motor vehicle. In addition, the system could automatically switch to IAS if the vehicle was determined to be within a tunnel as could be provided by a GPS navigation system.

Each of the cells within the lookup table as shown in Table 2 illustrate a record or data for the number of times an individual has activated the IAS and the EAS given a range of external and internal temperatures. In some instances, the number of times the individual has activated the IAS and the EAS can be initialized to zero. Upon query of one of the cells in the lookup table, the processing circuitry can determine the number of IAS activations and the number of EAS activations, and thus whether or not the IAS and/or EAS should be adjusted. It is appreciated that any function known to those skilled in the art can be used to adjust the IAS time and/or the EAS time, for example addition functions, subtraction functions, multiplication functions, division functions and the like. In addition, the IAS time and/or the EAS time can be limited to not fall below a given value and not be greater than a given value. For example, a minimum IAS and/or EAS time can be set to not be less than 1 second (sec), 5 sec, 10 sec, 30 sec, 60 sec, etc., and a maximum IAS and/or EAS time can be set to not be greater than 30 sec, 60 sec, 300 sec, 600 sec, 3000 sec, 6000 sec, etc. As such, it is appreciated that one of the activation times can be adjusted while the other time remains constant.

A trigger for the process and/or system can include an event such as the individual within the interior of the motor vehicle activating the IAS or the EAS. For example, a driver of the motor vehicle can push an IAS button or an EAS button within the motor vehicle. The event affords for the processing circuitry to accept data from and/or query data from sensors in order to determine one or more current conditions of the motor vehicle. Once the one or more current motor vehicle conditions has been determined, the processing circuitry can query one or more cells from the lookup table that correlate to the one or more motor vehicle conditions. Upon query of the one or more cells, data can be read and the IAS time and the EAS can be adjusted if the number of manual IAS activations is not equal to the number of manual EAS activations.

As shown in Table 2, one motor vehicle condition, or a combination of two or more motor vehicle conditions, can be the difference in temperature between the exterior and interior of the motor vehicle. Although specific ranges are shown, it is appreciated that linguistic variables, also known as fuzzy logic, can be used to define the plurality of cells. For example and for illustrative purposes only, the system can use terms such as "hot", "warm", "cool", "cold", "very cold", and the like.

The system automatically alternates between running on IAS and EAS for the durations of the IAS time and the EAS time specified by a particular cell of the lookup table corresponding to a current temperature range. In the event that a temperature range changes during operation of the motor vehicle, the processing circuitry can detect such change from the sensors, query a different cell, and afford for a different IAS time and/or EAS time for the activation of the IAS and EAS, respectively.

In this manner, the system and process are capable of learning or adapting to a particular individual and their air quality habits. It is appreciated that the motor vehicle can have a separate lookup table for different individuals that may or may not drive the motor vehicle.

Referring again to Table 2, the cells with "no data" can reflect the fact that some motor vehicle conditions are unlikely/impossible to occur due to the limited power of a motor vehicle air conditioner, heater, and the like. In addition, an individual's preferences can result in unlikely/impossible conditions. For example and for illustrative purposes only, an individual is unlikely to drive a vehicle that is −20° C. inside the motor vehicle, especially when the temperature is much warmer outside the vehicle.

It is appreciated that the system and/or process can result in fewer changes or manual interventions for activations of the IAS and the EAS over cumulative time of its operation. For example and for illustrative purposes only, if an individual regularly travels through a tunnel with the motor vehicle, the RLS can learn that for a given GPS location, the IAS should be activated. In this manner, the air quality within the interior can be improved.

In view of the teaching presented herein, it is to be understood that numerous modifications and variations of the present invention will be readily apparent to those of skill in the art. Likewise, the foregoing is illustrative of specific embodiments of the invention, but is not meant to be a limitation upon the practice thereof. It is the following claims, including all equivalents, which define the scope of the invention.

I claim:

1. A process for controlling air quality within an interior of a motor vehicle, the process comprising:
    providing a motor vehicle with an HVAC system, the HVAC system having an internal air supply (IAS) option and an external air supply (EAS) option, the HVAC system having an automated controller operative to activate the IAS for an IAS time and to activate the EAS for an EAS time, the HVAC system also having a manual controller operative for an individual to manually activate the IAS and the EAS; and
    providing a reinforcement learning system (RLS) having a memory circuitry and a processing circuitry;
    the memory circuitry having a lookup table with a plurality of cells, each of the plurality of cells associated with a motor vehicle condition and having a datum for a number of manual IAS activations and a datum for a number of manual EAS activations;
    the processing circuitry querying one of the plurality of cells as a function of a current motor vehicle condition, reading the number of manual IAS activations and the number of manual EAS activations for the one cell, and adjusting the IAS time and the EAS time as a function of the queried data.

2. The process of claim 1, wherein adjusting the IAS time and the EAS time includes:
    increasing the IAS time and decreasing the EAS time if the number of manual IAS activations is greater than the number of manual EAS activations;
    decreasing the IAS time and increasing the EAS time if the number of manual IAS activations is less than the number of manual EAS activations; and
    leaving the IAS time and the EAS time unchanged if the number of manual IAS activations is equal to the number of manual EAS activations or there is no event for manually activating either the IAS or EAS.

3. The process of claim 1, wherein the different motor vehicle condition is selected from the group consisting of temperature external to the motor vehicle, temperature of an interior of the motor vehicle, barometric pressure outside the motor vehicle, humidity inside the motor vehicle, humidity outside the vehicle, traveling speed of the motor vehicle, GPS location of the motor vehicle, proximity of the motor vehicle to other objects and combinations thereof.

4. The process of claim 3, wherein each of the plurality of cells is associated with a combination of different motor vehicle conditions.

5. The process of claim 3, wherein at least one of the motor vehicle conditions is coded in a linguistic variable term.

6. The process of claim 1, wherein the IAS time and the EAS time are increased or decreased according to the expression:

$$t_j^{i+1}=f(t_j^i,\Delta t_j) j=1,2$$

where $t_1$ is the IAS time, $t_1^{i+1}$ is an adjusted IAS time, $t_1^i$ is a previous adjusted IAS time, $\Delta t_1$ is a change in the IAS time, $t_2$ is the EAS time, $t_2^{i+1}$ is an adjusted EAS time, $t_2^i$ is a previous adjusted EAS time, and $\Delta t_2$ is a change in the EAS time.

7. The process of claim 6, wherein $f(t_j^i,\Delta t_j)=t_j^i+\Delta t_j$ for increasing the IAS time when j=1 and increasing the EAS time when j=2, and $f(t_j^i,\Delta t_j)=t_j^i-\Delta t_j$ for decreasing the IAS time when j=1 and decreasing the EAS time when j=2.

8. The process of claim 6, wherein $f(t_j^i,\Delta t_j)=t_j^i \cdot \Delta t_j$ for increasing the IAS time when j=1 and increasing the EAS time when j=2, and $f(t_j^i,\Delta t_j)=t_j^i/\Delta_j$ for decreasing the IAS time when j=1 and decreasing the EAS time when j=2.

9. An air quality control system for controlling the air quality within an interior of a motor vehicle, the air quality control system comprising:
   a motor vehicle with a heating-venting-air conditioning (HVAC) system, said HVAC system having:
      an internal air supply (IAS) option and an external air supply (EAS) option;
      a manual controller operative for an individual to manually activate said IAS and said EAS; and
   a reinforcement learning system (RLS) having a memory circuitry and a processing circuitry, said RLS in electronic communication with said IAS and said EAS;
   said memory circuitry having a lookup table with a plurality of cells, each of said plurality of cells associated with a motor vehicle condition and having a datum for a number of manual IAS activations and a datum for a number of manual EAS option;
   each of said plurality of cells also having a stored IAS time value associated with how long said IAS should be activated for said motor vehicle condition and a stored EAS time value associated with how long said EAS should be activated for said motor vehicle condition;
   said processing circuitry operative to query one of said plurality of cells as a function of a current motor vehicle condition, read said number of manual IAS activations and said number of manual EAS activations and adjust said IAS time value and said EAS time value as a function of said number of manual IAS activations and said number of manual EAS activations.

10. The air quality system of claim 9, wherein said processing circuitry:
    increases said stored IAS time value and decreases said stored EAS time value if said number of manual IAS activations is greater than said number of manual EAS activations;
    decreases said stored IAS time value and increases said stored EAS time value if said number of manual IAS activations is less than said number of manual EAS activations; and
    leaves said stored IAS time value and said stored EAS time value unchanged if said number of manual IAS activations is equal to said number of manual EAS activations.

11. An air quality control system for controlling air quality within an interior of a motor vehicle, said air quality control system comprising:
    a motor vehicle with a heating-venting-air conditioning (HVAC) system, said HVAC system having:
       an internal air supply (IAS) option and an external air supply (EAS) option;
       an automated controller operative to activate said IAS option and said EAS option;
       a manual controller operative for an individual to override said automated controller and manually activate said IAS option and said EAS option;
    a reinforcement learning system (RLS) in electronic communication with said automated controller, said RLS operative to maximize a length of time said IAS option is activated as a function of input from the individual and a motor vehicle condition when the individual is operating said motor vehicle, for the purpose of reducing the number of times the individual has to manually activate/switch between said IAS option or said EAS option.

12. The air quality control system of claim 11, wherein said input from the individual is manual activation of said IAS option and said EAS option as a function of said motor vehicle condition.

13. The air quality control system of claim 11, wherein said RLS has a memory circuitry and a processing circuitry.

14. The air quality control system of claim 13, wherein said memory circuitry is operative to store a number of times the individual has manually activated said IAS option and said EAS option for said motor vehicle condition of said motor vehicle.

15. The air quality control system of claim 14, wherein said memory circuitry is operative to store an IAS time value and an EAS time value for said motor vehicle condition of said motor vehicle, said IAS time value associated with a length of time said automated controller activates said IAS option before activating said EAS option and said EAS time value associated with a length of time said automated controller activates said EAS option before activating said IAS option.

16. The air quality control system of claim 15, wherein said processing circuitry is operative to change said IAS time value and said EAS time value for said motor vehicle condition as a function of said number of times the individual has manually activated said IAS option and said EAS option for said motor vehicle condition.

17. The air quality control system of claim 16, wherein said processing circuitry increases said IAS time value and decreases said EAS time value for said motor vehicle condition if said number of times the individual has manually activated said IAS option is greater than said number of times the individual has manually activated said EAS option for said motor vehicle condition.

18. The air quality control system of claim 16, wherein said processing circuitry decreases said IAS time value and increases said EAS time value for said motor vehicle condition if said number of times the individual has manually activated said IAS option is less than said number of times the individual has manually activated said EAS option for said motor vehicle condition.

19. The process of claim 16, wherein said processing circuitry changes said IAS time value and said EAS time value according to the expression:

$$t_j^{i+1}=f(t_j^i,\Delta t_j) j=1,2$$

where $t_1$ is the IAS time value, $t_1^{i+1}$ is an adjusted IAS time value, $t_1^i$ is a previous adjusted IAS time value, $\Delta t_1$ is a change in the IAS time value, $t_2$ is the EAS time value, $t_2^{i+1}$ is an adjusted EAS time value, $t_2^i$ is a previous adjusted EAS time value, and $\Delta t_2$ is a change in the EAS time value.

20. The process of claim 19, wherein $f(t_j^i,\Delta t_j)=t_j^i+\Delta t_j$ for increasing the IAS time value when j=1 and increasing the EAS time value when j=2, and $f(t_j)=t_j^i-\Delta t_j$ for decreasing the IAS time value when j=1 and decreasing the EAS time value when j=2.

21. The process of claim 19, wherein $f(t_j^i,\Delta t_j)=t_j^i\cdot\Delta t_j$ for increasing the IAS time value when j=1 and increasing the EAS time value when j=2, and $f(t_j)=t_j^i/\Delta t_j$ for decreasing the IAS time value when j=1 and decreasing the EAS time value when j=2.

* * * * *